July 23, 1968 C. R. SACCHINI 3,393,777
MEANS FOR PREVENTING HELICAL SPRINGS IN SPRING
CLUTCH MECHANISMS FROM BUCKLING
Filed Sept. 14, 1966

INVENTOR.
COLUMBUS R. SACCHINI
BY
*William V. Cbs*
ATTORNEY

United States Patent Office 3,393,777
Patented July 23, 1968

3,393,777
MEANS FOR PREVENTING HELICAL SPRINGS
IN SPRING CLUTCH MECHANISMS FROM
BUCKLING
Columbus R. Sacchini, Willowick, Ohio, assignor to
Curtiss-Wright Corporation, a corporation of Delaware
Filed Sept. 14, 1966, Ser. No. 579,284
2 Claims. (Cl. 192—8)

ABSTRACT OF THE DISCLOSURE

A spring clutch having helical friction springs arranged in a non-rotary housing to enable the bidirectional transmission of torque from an input shaft to a coaxial output shaft while substantially blocking the transmission of torque from the output shaft to the input shaft and is provided with a helically shaped rigid member between the springs to prevent the springs from buckling, the rigid member being formed with a gap wherein free ends of the springs are actuable upon rotation of the input shaft.

My invention relates to helical coil spring clutch mechanisms. More particularly, the invention is directed to means for preventing the helical springs in such mechanisms from buckling.

In spring clutch mechanisms wherein helical springs may at times be subjected to high twisting loads, there is the ever present danger that the springs will be buckled and caused to fail prematurely. A bidirectional no-back spring clutch, that is, a clutch of the type wherein helical friction springs in a non-rotary housing are arranged to enable the bidirectional transmission of torque from an input shaft to a coaxial output shaft while substantially blocking the transmission of torque from the output to the input shaft, is an example of a spring clutch mechanism of the type in which the problem is encountered.

It is a prime object of the invention to provide improved means to prevent helical springs in spring clutch mechanisms from buckling due to the action of twisting loads.

It is another object of the invention to provide a simply constructed bidirectional no-back spring clutch mechanism in which buckling of the helical springs is effectively prevented.

Other objects and advantages of the invention will become apparent during a reading of the specification taken in connection with the accompanying drawing wherein.

Figure 1:
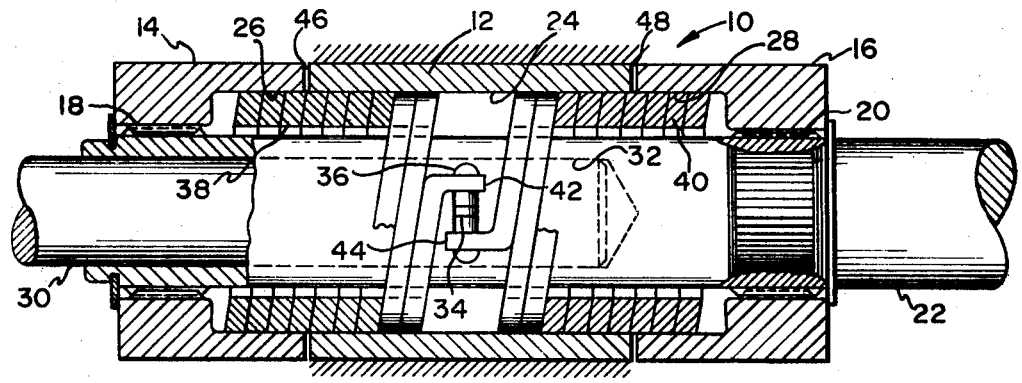
FIG. 1 is a horizontal, longitudinal, sectional view taken through a conventional bidirectional no-back spring clutch.
Figure 2:
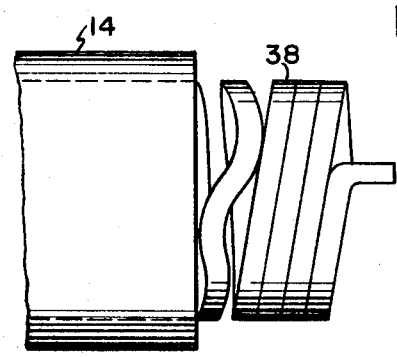
FIGS. 2 and 3 are plan views showing typical ways in which the springs in the clutch of FIG. 1 tend to buckle.
Figure 3:
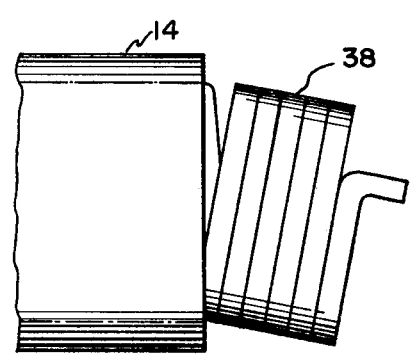

Referring to FIG. 1 of the drawing, reference character 10 designates a conventional bidirectional no-back spring clutch. The clutch is of the kind shown, for example, in United States Patent No. 2,946,417 issued July 26, 1960, to P. C. Hungerford, Jr.

The clutch 10 includes a fixed drum 12 and two rotatable drums 14 and 16, the rotatable drums 14 and 16 being splined at 18 and 20, respectively, to an output shaft 22. The drums 12, 14 and 16 have inner surfaces 24, 26 and 28, respectively, all of which are of the same diameter. An input shaft 30 is piloted in an opening 32 in the output shaft, and a pin 34 mounted in the input shaft projects through an arcuate slot 36 in the output shaft. A pair of helical springs 38 and 40 of the same hand encircle the output shaft. Such springs are formed with an outside diameter slightly greater than the diameters of the inner surfaces of the drums so as to bring the spring 38 into interference with inner surfaces 24 and 26, and the spring 40 into interference with inner surfaces 24 and 28. Spring 38 is secured at one end to drum 14, as for example, in the manner shown in the aforesaid patent, and spring 40 is similarly secured in the drum 16. The springs 38 and 40 extend toward each other from their secured ends and terminate in tangs 42 and 44, respectively, which are disposed in line with pin 34. In the disengaged condition of the clutch, such tangs 42 and 44 are equally spaced from the pin 34 as shown.

The output shaft 22 cannot turn the input shaft, since any turning moment acting on the output shaft causes one or the other of drums 14 and 16 (depending upon the direction of the torque) to tighten the spring to which the drum is attached against the inner surface of such drum and the inner surface 24 of fixed drum 12. However, the output shaft 22 may be rotated by the application of torque to input shaft 30. A driving torque applied to the input shaft first causes the pin 34 to engage the tang of one spring (i.e., tang 42 of spring 38, or tang 44 of spring 40, according to the direction of the torque) and contract the spring away from the fixed drum 12. The pin 34 then engages one end of the slot 36 and drives the output shaft in the direction of rotation of the input shaft. The other spring overruns the inner surface of the fixed drum 12 while the output shaft is rotated by the input shaft.

Figure 4:
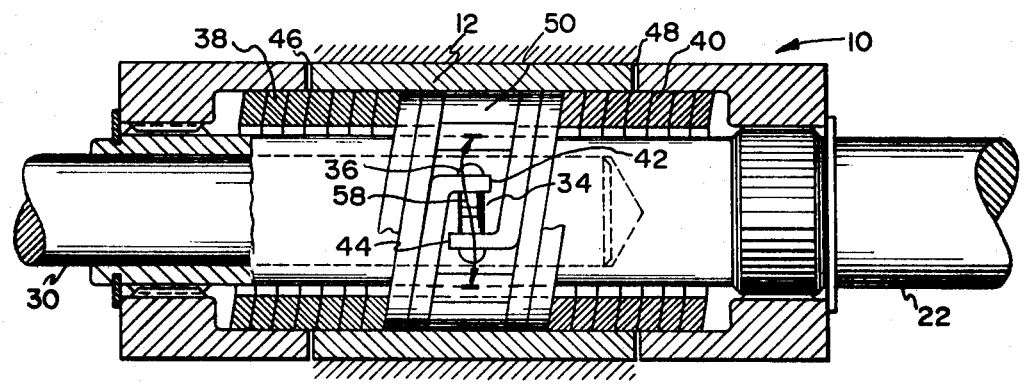
FIG. 4 is a horizontal, longitudinal, sectional view showing the clutch of FIG. 1 adapted according to the invention to prevent the helical springs of the device from buckling.
Figure 5:
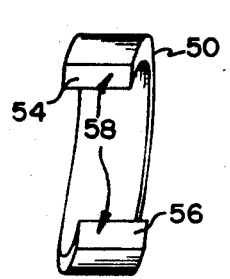
FIG. 5 is a front elevational view of a spacer included in the clutch of FIG. 4.
Figure 6:
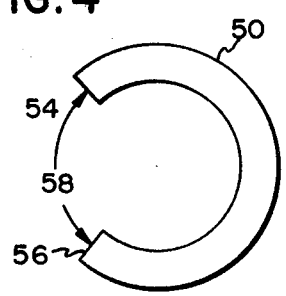
FIG. 6 is an end view of the spacer of FIG. 5.

In clutches of the described type, the helical springs tend to buckle. Referring to the clutch of FIG. 1, coils of the springs 38 and 40 in the vicinity of the crossover gaps 46 and 48 between the rotatable drums and fixed drum 12 tend to separate and buckle during the no-back phase of operation of the clutch when subjected to a twisting moment caused by the application of a high torque to the output shaft. Buckling is prevented in accordance with the invention by means of a rigid helical spacer 50 which is fitted between the springs with its side edges lightly contacting the end coils (see FIGS. 4, 5 and 6). Such spacer supports each spring at the engaged end to prevent axial movement of the coils throughout the length of the spring and eliminate any tendency of the coils to buckle when subjected to the action of a twisting moment. The spacer 50 is slightly less in diameter than the inside diameter of the fixed drum 12 and can turn within the fixed drum 12. The spacer turns with the output shaft when the input shaft is rotated, being driven at such time by spring tang 42 in engagement with one end 54 of the spacer or spring tang 44 in engagement with the other end 56 of the spacer, depending upon the direction of rotation of the shafts. The ends 54 and 56 of the spacer define a gap 58 sufficient to permit tang 42 or 44 to be moved to an extreme position by the pin 34 wherein the pin engages the end of arcuate slot 36.

While only one embodiment of the invention has been shown and described, it will be readily apparent to persons skilled in the art that other embodiments of the invention are also possible and that various changes and modifications in the device illustrated and described can be made without departing from the spirit and scope of the invention as defined in the annexed claims.

What is claimed is:

1. A spring clutch comprising an input shaft; an output shaft rotatable by the input shaft; fixed structure; a pair of helical springs having an interference fit with the fixed structure, each such spring being secured at one end for rotation with the output shaft and free at the other end, the springs extending from their secured ends toward each other and being of the same hand whereby upon the application of torque to the output shaft in one direction, one spring is actuated to lock the output shaft to the fixed structure against rotation, and upon the application of torque to the output shaft in the opposite direction, the other spring is actuated to lock the output shaft to the fixed structure against rotation: a rigid member between the free ends of the springs in contact with the end coil of each spring to prevent axial separation and buckling of each of the springs when actuated by a torque on the output shaft, said rigid member having a gap between its ends wherein the free ends of the springs are located; and means extending into said gap to actuate the free end of one spring upon rotation of the input shaft in one direction and the free end of the other spring upon rotation of the input shaft in the opposite direction to unlock the output shaft from the fixed structure for rotation in the direction of rotation of the input shaft.

2. A spring clutch as defined in claim 1 wherein said rigid member is helical in form and has edges which coincide with end coils of the springs.

References Cited
UNITED STATES PATENTS

| | | |
|---|---|---|
| 2,255,671 | 9/1941 | Loehr. |
| 2,336,757 | 12/1943 | Starkey. |
| 2,458,441 | 1/1949 | Starkey _____ 192—8 |
| 2,947,278 | 8/1960 | Magill _____ 192—8 |
| 3,193,066 | 7/1965 | Tomko _____ 192—8 |

BENJAMIN W. WYCHE III, *Primary Examiner.*

L. J. PAYNE, *Assistant Examiner.*